(12) United States Patent
Kim et al.

(10) Patent No.: US 10,050,502 B2
(45) Date of Patent: Aug. 14, 2018

(54) DOUBLE STATOR AND MOTOR COMPRISING SAME

(71) Applicant: AMOTECH CO., LTD., Incheon (KR)

(72) Inventors: Byung Soo Kim, Anyang-si (KR); Hak Rok Kim, Daegu (KR); Hyung Hwan Ko, Anseong-si (KR)

(73) Assignee: AMOTECH CO., LTD., Incheon (KR)

( * ) Notice: Subject to any disclaimer, the term of this patent is extended or adjusted under 35 U.S.C. 154(b) by 360 days.

(21) Appl. No.: 15/014,416

(22) Filed: Feb. 3, 2016

(65) Prior Publication Data

US 2016/0156255 A1   Jun. 2, 2016

Related U.S. Application Data

(63) Continuation of application No. PCT/KR2014/007853, filed on Aug. 25, 2014.

(30) Foreign Application Priority Data

Aug. 23, 2013 (KR) .................. 10-2013-0100550
Apr. 30, 2014 (KR) .................. 10-2014-0052619

(51) Int. Cl.
*H02K 16/04* (2006.01)
*H02K 21/12* (2006.01)
(Continued)

(52) U.S. Cl.
CPC ............ *H02K 16/04* (2013.01); *H02K 1/148* (2013.01); *H02K 3/28* (2013.01); *H02K 3/325* (2013.01);
(Continued)

(58) Field of Classification Search
CPC .......... H02K 1/148; H02K 3/325; H02K 3/28; H02K 21/12; H02K 16/04; H02K 7/085
See application file for complete search history.

(56) References Cited

U.S. PATENT DOCUMENTS 6,570,275 B2 * 5/2003 Kim .................. H02K 21/16
                                                310/101
6,727,632 B2 * 4/2004 Kusase ................ H02K 1/27
                                                310/112
(Continued)

FOREIGN PATENT DOCUMENTS

JP    2008067493    3/2008
KR    20020063604   8/2002
(Continued)

OTHER PUBLICATIONS

International Search Report—PCT/KR2014/007853 dated Dec. 17, 2014.

*Primary Examiner* — Dang Le
(74) *Attorney, Agent, or Firm* — Cantor Colburn LLP

(57) ABSTRACT

A double stator includes: a stator core; a bobbin wrapped on an outer circumferential surface of the stator core; and a first coil wound on one side of the stator core and a second coil wound on the other side of the stator core. The stator core includes: a lamination type core portion formed by laminating a plurality of iron pieces, on an outer surface of which a first press-fit groove is formed, and on an inner surface of which a second press-fit groove is formed; a first integration type core portion fixed to the first press-fit groove of the lamination type core portion, integrally formed by metal powders, and on which a first coil is wound; and a second integration type core portion fixed to the second press-fit groove of the lamination type core portion, integrally formed by metal powders, and on which a second coil is wound.

18 Claims, 14 Drawing Sheets

(51) Int. Cl.
*H02K 1/14* (2006.01)
*H02K 7/08* (2006.01)
*H02K 3/28* (2006.01)
*H02K 3/32* (2006.01)
*H02K 7/14* (2006.01)

(52) U.S. Cl.
CPC ............ *H02K 7/085* (2013.01); *H02K 21/12* (2013.01); *H02K 7/14* (2013.01); *H02K 2213/03* (2013.01)

(56) References Cited

U.S. PATENT DOCUMENTS

| | | | | |
|---|---|---|---|---|
| 8,866,362 | B2 * | 10/2014 | Bagepalli | H02K 21/12 310/216.016 |
| 8,970,080 | B2 * | 3/2015 | Li | H02K 29/03 310/114 |
| 9,644,305 | B2 * | 5/2017 | Kim | D06F 37/30 |
| 2004/0239199 | A1 * | 12/2004 | Qu | H02K 21/16 310/114 |
| 2009/0091204 | A1 * | 4/2009 | Koshiba | H02K 16/02 310/114 |
| 2014/0091662 | A1 * | 4/2014 | Kim | D06F 37/304 310/114 |

FOREIGN PATENT DOCUMENTS

| | | |
|---|---|---|
| KR | 1020070092816 | 9/2007 |
| KR | 20120090555 | 8/2012 |
| KR | 1020130051578 | 5/2013 |
| KR | 20130060239 | 6/2013 |
| KR | 20130074151 | 7/2013 |
| KR | 1020130072589 | 7/2013 |

\* cited by examiner

DOUBLE STATOR AND MOTOR COMPRISING SAME

TECHNICAL FIELD

The present invention relates to a motor, and more specifically, to a double stator having a configuration of a hybrid type stator core that is formed by combining a lamination type core and a compressed powder magnetic core in a manner to supplement disadvantages of and take advantages of a one-piece integration type core of the lamination type core and the compressed powder magnetic core, to thus achieve a high-power, high-speed, high-efficiency, and thin structured stator, and a motor having the same.

BACKGROUND ART

A lot of equipment used in various fields such as high-speed machine tools, air motors and actuators, compressors of the recent techniques require electric motors enabling high-speed operations exceeding 15,000~20,000 rpm, and in some cases up to 100,000 rpm.

Most of high-speed electric devices are manufactured with low pole count, which is to prevent magnetic materials in the electric devices to operate at higher frequencies from leading to too excessive core losses. The main cause is in the fact that soft magnetic materials used in most of motors are made up of Si—Fe alloys. In the conventional Si—Fe-based materials, the losses resulting from a magnetic field changing at a frequency of about 400 Hz or more may heat a material until the materials may often not be cooled even by any suitable cooling means.

Typically, electric motors include magnetic members formed of a plurality of stacked lamination plates made of non-oriented electric steel sheets. Each lamination plate is typically formed by stamping, punching or cutting mechanically soft non-oriented electric steel sheets into a desired shape. The formed lamination plates are stacked over one another, to thus form a rotor or stator in a desired form.

When compared to the non-oriented electric steel sheets, amorphous metals provide excellent magnetic performance, but have been considered as being unsuitable for a long time for use in bulk magnetic members for a stator and a rotor for an electric motor because of faults occurring on particular physical properties and processing.

For example, the amorphous metals are thinner and harder than the non-oriented electric steel sheets, so fabrication tools and dies are worn more rapidly. An increase in the tooling and manufacturing costs may cause fabrication of bulk amorphous metal magnetic members to fail to have commercial competitiveness as compared to conventional techniques such as punching or stamping. The thickness of the amorphous metal may also come to an increase in the lamination number of the assembled members, and also increase the total cost of an amorphous metal rotor or stator magnet assembly.

The amorphous metals are fed into thin continuous ribbons having a uniform ribbon width. However, amorphous metals are very hard materials, and thus it is very difficult to easily mold or cut the amorphous metals. When the amorphous metal ribbons undergo an annealing process to ensure peak magnetic properties, the amorphous metal ribbons take on significantly great brittleness. This makes it difficult and costly to use conventional methods to form bulk amorphous magnetic members. In addition, the brittle amorphous metal ribbons lead to concerns about the durability of the bulk magnetic members in the application of electric motors.

Taking these points into consideration, Korean Patent Application Publication No. 2002-0063604 disclosed a low-loss amorphous metal magnetic component having a polyhedral shape and including multiple layer amorphous strips, for use in a high-efficiency electric motor. The amorphous metal magnetic component may be operated in a frequency range of about 50 Hz-20,000 Hz, has a core loss so as to exhibit improved performance characteristics compared with a silicon-steel magnetic component operating in the same frequency range as that of the amorphous metal magnetic component, and has a laminated structure with an epoxy after forming a plurality of cut strips having a predetermined length by cutting an amorphous metal strip in order to form a polyhedral shaped body.

However, the above-described Korean Patent Application Publication No. 2002-0063604 disclosed that the amorphous metal ribbons having still significant brittleness are prepared through a molding process such as a cut to thus cause a problem that it is difficult to make a practical application, and did not disclose a high-speed frequency application operating in a frequency range of 50 Hz-20,000 Hz.

Meanwhile, when implementing a high-speed motor of 50,000 rpm with a high-power of 100 kW such as a drive motor for an electric vehicle, by using silicon steel sheets, eddy current is increased due to high speed rotation to thereby cause a heat generation problem. In addition, since such a motor is fabricated in a large size, it is not applicable for a drive system of an in-wheel motor structure and it is not preferable in terms of increasing weight of the vehicle.

Typically, the amorphous strip has a low eddy current loss, but it is difficult to put a conventional core for a motor that is manufactured by winding or molding and laminating the amorphous strip to a practical use because of the difficulty of a manufacturing process as pointed out in the conventional art.

As described above, the prior art amorphous strip provides superior magnetic performance as compared to the non-oriented electrical steel sheet, but has not been used as the bulk magnetic member for a stator and a rotor for an electric motor because of defects occurring in the manufacturing process.

In view of this point, Korean Patent Application Publication No. 2013-0060239 disclosed a method of manufacturing a stator in which a plurality of split type stator cores are prepared by compression-molding amorphous metal powders and assembling the plurality of split type stator cores by using a bobbin. However, the degree of adhesion between the split type stator cores falls and thus there is a problem that the magnetic resistance is increased.

In addition, in the case of compression-molding amorphous metal powders to thereby prepare split type stator cores, the structure of a mold is complicated. Further, when the split type stator cores are coupled with each other, a coupling protrusion portion that forms a coupling structure may fall off due to a weak coupling strength.

Further, the conventional method of manufacturing stator cores by using amorphous cores has not proposed a design scheme of a magnetic core that is optimal to an electric motor field having high-power, high-speed, high-torque, and high-frequency characteristics.

Furthermore, a need for improved amorphous metal motor members indicating a combination of good magnetic and physical properties needed for high-speed, high-efficiency electric appliances has emerged. Development of a manufacturing method that can be performed for use of amorphous metals efficiently and for the mass production of various types of motors and magnetic components used therefor is required.

It is difficult to wind a slotted stator. In addition, the slotted stator requires a lot of time in the coil winding and requires complicated expensive coil winding equipment. In addition, a stator core having a plurality of teeth may have an advantage capable of using a low-cost general-purpose winding machine in the coil windings by assembling split type stator cores to prepare the stator core.

A drive motor for a drum type washing machine has required a slim-type drive motor because of a narrow installation space at the rear side of a tub. To meet the slimming requirement, it is necessary to reduce a core stack height in the axial direction to form a stator core and the height of the coil winding.

In addition, the larger core stack height is increased, and the coil winding length is increased to thereby increase a copper loss and also consumption of the coil wound thereto.

Further, when employing low-cost ferrite magnets for a rotor, instead of expensive Nd magnets, an overhang design that increases sizes of the magnets is applied for an increase of the motor efficiency. Accordingly, there is a problem that an end turn loss has occurred.

As described above, in the case of configuring a stator core with only a one-piece integration type core of a lamination type core and a compressed powder magnetic core, it is difficult to provide a stator of a high-speed, high-efficiency, thin and multi-slot structure.

SUMMARY OF THE INVENTION

To solve the above problems or defects, it is an object of the present invention to provide a double stator having a configuration of a hybrid type stator core that is formed by combining a lamination type core and a compressed powder magnetic core in a manner to supplement disadvantages of and take advantages of a one-piece integration type core of the lamination type core and the compressed powder magnetic core, to thus achieve a high-power, high-speed, high-efficiency, and thin structured stator, and a motor having the same.

It is another object of the present invention to provide a double stator and a motor having the same, in which a stator core of a compressed powder magnetic core is prepared in a one-piece by compression-molding amorphous metal powders, soft magnetic powders or a mixture of the amorphous metal powders and the soft magnetic powders, to thus reduce a core loss to thereby reduce a manufacturing cost of a mold and simplify a manufacturing process.

It is still another object of the present invention to provide a double stator and a motor having the same, in which winding portions around which a first coil and a second coil are wound are formed as integration type core portions, and a connection portion connecting between stator cores of a complex shape is formed as a lamination type core portion, in which each of the integration type core portions are mutually coupled with either side of the lamination type core portion.

It is yet another object of the present invention to provide a double stator and a motor having the same, in which a lamination type core portion is formed by laminating a plurality of iron pieces wherein a first yoke portion and a second yoke portion around which a first coil and a second coil are respectively wound are formed radially from a ring portion, and a stator core is formed by press-fixing a first integration type core portion and a second integration type core portion that are integrally formed on the first yoke portion and the second yoke portion with metal powders, to thereby increase efficiency by increasing a magnetization strength.

It is still yet another object of the present invention to provide a double stator and a motor having the same, in which a lamination type core portion is formed in an arc shape or a circular ring shape having a predetermined angle, to thus reduce a number of times of assembling stator cores or eliminate the need to assemble the stator cores to thereby shorten an assembly process and improve productivity.

It is a further object of the present invention to provide a double stator and a motor having the same, in which a stack height of a lamination type core portion is set to be the same as a height of a yoke portion of an integration type core portion, to thus reduce the stack height of the lamination type core portion and enable axial slimming of a motor.

It is a still further object of the present invention to provide a double stator and a motor having the same, in which a first magnet and a second magnet of a double rotor can be designed to have the same height as that of a stator core, to thus improve motor efficiency.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided a double stator comprising: a stator core; a bobbin wrapped on an outer circumferential surface of the stator core; and a first coil wound on one side of the stator core and a second coil wound on the other side of the stator core, wherein the stator core comprises: a lamination type core portion that is formed by laminating a plurality of iron pieces, on an outer surface of which a first press-fit groove is formed, and on an inner surface of which a second press-fit groove is formed; a first integration type core portion that is fixed to the first press-fit groove of the lamination type core portion, integrally formed by metal powders, and on which a first coil is wound; and a second integration type core portion that is fixed to the second press-fit groove of the lamination type core portion, integrally formed by metal powders, and on which a second coil is wound.

Preferably but not necessarily, the first integration type core portion comprises: a first yoke portion on which a first coil is wound; and a first flange portion that is integrally formed at one end of the first yoke portion and that is disposed to face to an outer rotor, and wherein the second integration type core portion comprises: a second yoke portion on which a second coil is wound; and a second flange portion that is integrally formed at one end of the second yoke portion and that is disposed to face to an inner rotor.

Preferably but not necessarily, the first and second integration type core portions are formed of amorphous metal powders, soft magnetic powders or alloy powders that are formed by mixing amorphous metal powders and spherical type soft magnetic powders.

Preferably but not necessarily, the lamination type core portion comprises: a connecting portion on an outer surface of which the first press-fit groove is formed in which the first integration type core portion is press-fitted into the first press-fit groove, and on an inner surface of which the second press-fit groove is formed in which the second integration type core portion is press-fitted into the second press-fit groove; a coupling protrusion that is formed on one side of the connecting portion; and a locking groove that is formed on the other side of the connecting portion and into which the coupling protrusion is fitted and coupled, wherein a plurality of the lamination type core portions are cross-coupled in an annular form.

Preferably but not necessarily, the lamination type core portion comprises: a first lamination type core portion formed in an arc form of a predetermined angle; a second lamination type core portion that is assembled with the first lamination type core portion; and a third lamination type core portion that is assembled between the second lamination type core portion and the first lamination type core portion, wherein the first, second and third lamination type core portions are cross-coupled in an annular form.

Preferably but not necessarily, a locking groove is formed at one end of each of the first, second and third lamination type core portions and a coupling protrusion is formed at the other end of each of the first, second and third lamination type core portions, and a plurality of the first press-fit grooves are formed at a predetermined interval on respective outer surfaces of the first, second and third lamination type core portions in which the first integration type core portion is press-fitted into each of the first press-fit groove, and a plurality of the second press-fit grooves are formed at a predetermined interval on respective inner surfaces of the first, second and third lamination type core portions in which the second integration type core portion is press-fitted into each of the second press-fit groove.

Preferably but not necessarily, the lamination type core portion is formed into a circular ring shape, in which a plurality of the first press-fit grooves are formed at a predetermined interval on an outer surface of the lamination type core portion in which the first integration type core portion is press-fitted into the first press-fit groove, and a plurality of the second press-fit grooves are formed at a predetermined interval on an inner surface of the lamination type core portion in which the second integration type core portion is press-fitted into the second press-fit groove.

Preferably but not necessarily, the bobbin surrounds a portion of outer circumferential surfaces of the first and second integration type core portions and the lamination type core portion, so as to integrate the first and second integration type core portions with the lamination type core portion.

Preferably but not necessarily, the lamination type core portion is bolted to a fixing bracket or is formed integrally with the fixing bracket.

Preferably but not necessarily, a stack height of the lamination type core portion is set to be the same as heights of the first and second yoke portions.

Preferably but not necessarily, coil winding grooves whose heights are formed lower than those of the top and bottom surfaces of the first and second flange portions are formed on the top and bottom surfaces of the first and second yoke portions, respectively.

According to another aspect of the present invention, there is provided a double stator comprising: a plurality of split type stator cores that are mutually connected in an annular form; a plurality of bobbins wrapped on the respective outer circumferential surfaces of the plurality of split type stator cores; and a first coil wound on one side of each of the plurality of bobbins, and a second coil wound on the other side of each of the plurality of bobbins, wherein each of the plurality of split type stator cores comprises: a lamination type core portion that is formed by laminating a plurality of iron pieces, on an outer surface of which a first press-fit groove is formed, and on an inner surface of which a second press-fit groove is formed, in which one lamination type core portion is cross-coupled with another; a first integration type core portion that is fixed to the first press-fit groove of the lamination type core portion, integrally formed by metal powders, and on which a first coil is wound; and a second integration type core portion that is fixed to the second press-fit groove of the lamination type core portion, integrally formed by metal powders, and on which a second coil is wound.

According to still another aspect of the present invention, there is provided a double stator comprising: a plurality of split type stator cores that are mutually connected in an annular form; a plurality of bobbins wrapped on the respective outer circumferential surfaces of the plurality of split type stator cores; and a first coil wound on one side of each of the plurality of bobbins, and a second coil wound on the other side of each of the plurality of bobbins, wherein each of the plurality of split type stator cores comprises: a lamination type core portion that is formed by laminating a plurality of iron pieces, and that comprises: a ring portion that is formed in an annular shape; a first yoke portion that is extended from one side of the ring portion and on which a first coil is wound; and a second yoke portion that is extended from the other side of the ring portion and on which a second coil is wound; a first integration type core portion into which the first yoke portion is press-fitted and that is integrally formed by compression-molding amorphous metal powders; and a second integration type core portion into which the second yoke portion is press-fitted and that is integrally formed by compression-molding amorphous metal powders.

Preferably but not necessarily, the ring portion is formed in any one type of a first type forming an annular shape in the case of being split and mutually assembled, a second type forming an arc shape in the case of being mutually assembled, and a third type forming a ring shape.

According to yet another aspect of the present invention, there is provided a motor comprising: a double stator according to any one of claims 1 to 14; an outer rotor that is disposed at a predetermined gap on an outer circumferential surface of the double stator; and an inner rotor that is disposed at a predetermined gap on an inner circumferential surface of the double stator.

Preferably but not necessarily, the motor further comprises a planetary gear set for decelerating the rotational speed of any one of the outer rotor and the inner rotor.

Preferably but not necessarily, the outputs of the outer rotor and the inner rotor are output via a single axis of rotation.

Preferably but not necessarily, the outer rotor is connected to an inner shaft connected to a pulsator of a washing machine, and the inner rotor is connected to an outer shaft connected to a washing tub of the washing machine.

As described above, a double stator and a motor having the same according to the present invention are provided in which a stator core of a compressed powder magnetic core is prepared in a one-piece by compression-molding amorphous metal powders, soft magnetic powders or a mixture of the amorphous metal powders and the soft magnetic powders, to thus reduce a core loss to thereby reduce a manufacturing cost of a mold and simplify a manufacturing process.

A double stator and a motor having the same according to the present invention are provided in which winding portions around which a first coil and a second coil are wound are formed as integration type core portions, and a connection portion connecting between stator cores of a complex shape is formed as a lamination type core portion, in which each of the integration type core portions are mutually coupled with either side of the lamination type core portion, to thereby prepare a stator core whose shape is complicated in a one-piece form.

A double stator and a motor having the same according to the present invention are provided in which a lamination type core portion is formed by laminating a plurality of iron pieces wherein a first yoke portion and a second yoke portion around which a first coil and a second coil are respectively wound are formed radially from a ring portion, and a stator core is formed by press-fixing a first integration type core portion and a second integration type core portion that are integrally formed on the first yoke portion and the second yoke portion with metal powders, to thereby increase efficiency by increasing a magnetization strength.

A double stator and a motor having the same according to the present invention are provided in which a lamination type core portion is formed in an arc shape or a circular ring shape having a predetermined angle, to thus reduce a number of times of assembling stator cores or eliminate the need to assemble the stator cores to thereby shorten an assembly process and improve productivity.

A double stator and a motor having the same according to the present invention are provided in which a stack height of a lamination type core portion is set to be the same as a height of a yoke portion of an integration type core portion, to thus reduce the stack height of the lamination type core portion and enable axial slimming of a motor so as to be usefully applied for a drum type washing machine.

In addition, according to the present invention, the circumferential length of a core is reduced by making an area of a core (a yoke portion) around which a coil is wound equal and reducing the height thereof, to thereby reduce a copper loss and a weight of the coil.

A double stator and a motor having the same according to the present invention are provided in which a first magnet and a second magnet of a double rotor can be designed to have the same height as that of a stator core, to thus improve motor efficiency.

DETAILED DESCRIPTION OF THE INVENTION

Figure 1:
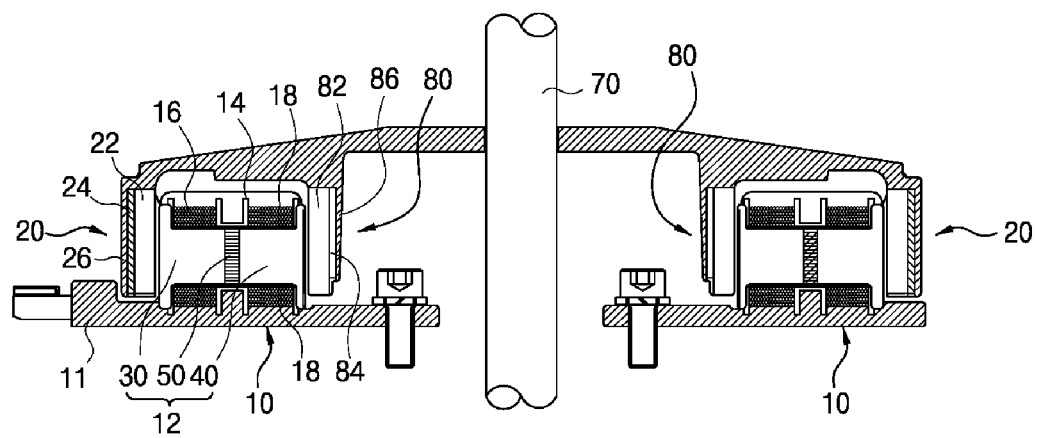
FIG. 1 is a cross-sectional view of a structure of applying a double stator according to a first embodiment of the present invention to a motor of a uniaxial structure.

Hereinafter, embodiments of the present invention will be described in detail with reference to the accompanying drawings. In the process, the size and shape of the components illustrated in the drawings may be exaggerated for convenience and clarity of explanation. Further, by considering the configuration and operation of the present invention, the specifically defined terms can be changed according to user's or operator's intention, or the custom. Definitions of these terms herein need to be made based on the contents across the whole application.

Referring to FIG. 1, a motor according to a first embodiment of the present invention includes: a double stator 10 around which a first coil 16 and a second coil 18 are wound; an outer rotor 20 that is disposed at a predetermined gap on an outer circumferential surface of the double stator 10; and an inner rotor 80 that is disposed at a predetermined gap on an inner circumferential surface of the double stator 10.

The outer rotor 20 includes: a first magnet 22 that is disposed at a predetermined gap from the outer surface of the stator 10; a first back yoke 24 that is disposed on a back surface of the first magnet 22; and a first rotor support 26 to which the first magnet 22 and the first back yoke 24 are fixed.

The inner rotor 80 includes: a second magnet 82 that is disposed at a predetermined gap from the inner surface of the stator 10; a second back yoke 84 that is disposed on a back surface of the second magnet 82; and a second rotor support 86 to which the second magnet 82 and the second back yoke 84 are fixed.

Here, the first rotor support 26 may be formed integrally by arranging the first magnet 22 and the first back yoke 24 in an annular form in a mold and insert molding the first magnet 22 and the first back yoke 24, and the second rotor support 86 may be also formed integrally by arranging the second magnet 82 and the second back yoke 84 in an annular form in a mold and insert molding the second magnet 82 and the second back yoke 84.

Because the motor shown in FIG. 1 according to the embodiment of the present invention is a double rotor type employing the double stator 10, the inner rotor 20 and the outer rotor 80 can be driven independently.

Thus, as shown in FIG. 1, the motor employing the double stator 10 according to the first embodiment of the present invention is configured so that the first rotor support 26 and the second rotor support 86 are formed integrally and are connected to a single rotary shaft 70 to generate a single output. Such a motor may control a driving force by applying a drive signal selectively to first and second coils of the double stator 10, as will be described later. That is, when only one of the outer rotor 20 and the inner rotor 80 is driven, the driving force is small, but when both the outer rotor 20 and the inner rotor 80 are driven simultaneously, c the driving force is large.

Figure 2:
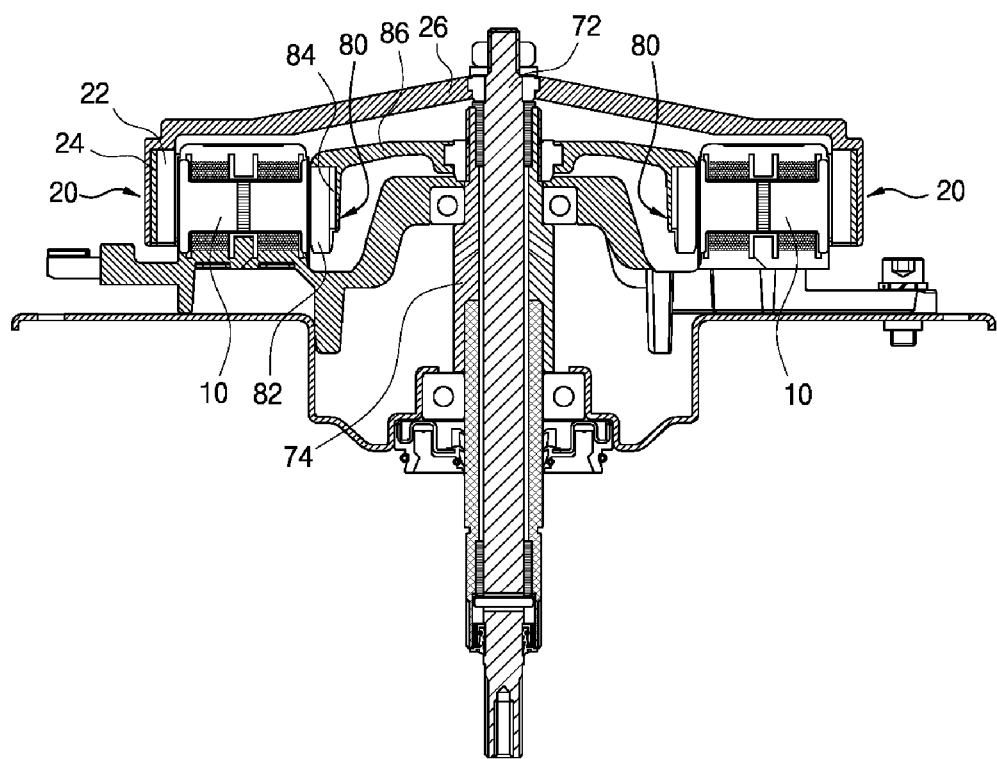
FIG. 2 is a cross-sectional view of a structure of applying a double stator according to the first embodiment of the present invention to a motor of a two-axis structure.

Further, as shown in FIG. 2, the motor according to the present invention is formed by combining the double stator 10 and the double rotor formed of the outer rotor 20 and the inner rotor 80 and illustrates another embodiment for generating two outputs, in which the inner rotor 20 and the outer rotor 80 are respectively connected to an inner shaft 72 and an outer shaft 74, and selectively applies a drive signal to first and second coils of the double stator 10, to thus independently drive the inner shaft 72 and the outer shaft 74.

When the motor shown in FIG. 2 is applied to a full-automatic washing machine, the first rotor support 26 is connected to the inner shaft 72 associated with a pulsator of the washing machine, and the second rotor support 86 is connected to the outer shaft 74 associated with a washing tub of the washing machine.

In this way, the motor in accordance with another embodiment of the present invention is configured so that when only the outer rotor 20 is driven, only pulsator is rotated, when only the inner rotor 80 is driven, only the washing tub is rotated, and when the outer rotor 20 and the inner rotor 80 are simultaneously driven, the pulsator and the washing tub are rotated simultaneously. Thus, the pulsator and the washing tub can be driven independently, to thus implement various types of washing modes by using the pulsator and the washing tub that are driven independently.

As shown in FIGS. 3 to 6 and 9, the double stator 10 according to the first embodiment of the present invention includes: a plurality of split type stator cores 12 that are disposed in an annular form; a plurality of non-magnetic bobbins 14 wrapped on the respective outer circumferential surfaces of the plurality of split type stator cores 12; a first coil 16 wound on one side of each of the plurality of split type stator cores 12, and a second coil 18 wound on the other side of each of the plurality of split type stator cores 12, and a fixing bracket 11 that fastens the plurality of split type stator cores 12.

Here, a first drive signal is applied to the first coil 16 and a second drive signal is applied to the second coil 18. Accordingly, when the drive signal is applied to only the first coil 16, only the outer rotor 20 generates a rotational force, when the drive signal is applied to only the second coil 18, the inner rotor 80 generates a rotational force, and when the drive signals are simultaneously applied to the first coil 16 and the second coil 18, both the outer rotor 20 and the inner rotor 80 generate a rotational force, respectively.

Further, the first drive signal applied to the first coil 16 and the second drive signal applied to the second coil 18 are controlled by using an inverter, the rotational directions of the outer rotor 20 and the inner rotor 80 may be selected in an identical direction or in opposite directions to each other.

The stator core 12 includes: a first integration type core portion 30 that is integrally formed by compression-molding amorphous metal powders in a mold, and on which a first coil 16 is wound; a second integration type core portion 40 that is integrally formed by compression-molding amorphous metal powders in a mold, and on which a second coil 18 is wound; and a lamination type core portion 50 that is formed by laminating a plurality of iron pieces into which the first integration type core portion 30 and the second integration type core portion 40 are press-fitted and that forms a magnetic path.

The first integration type core portion 30 includes: a first yoke portion 32 on which the first coil 16 is wound; and a first flange portion 34 that is integrally formed at one end of the first yoke portion 32 and that is disposed to face to an outer rotor 20 to serve as a magnetic pole.

The second integration type core portion 40 includes: a second yoke portion 42 on which the second coil 18 is wound; and a second flange portion 44 that is integrally formed at one end of the second yoke portion 42 and that is disposed to face to an inner rotor 80 to serve as a magnetic pole.

Here, the first yoke portion 32 and the first flange portion 34 may be manufactured separately and interconnected with each other, respectively. Similarly, the second yoke portion 42 and the second flange portion 44 may also be manufactured separately and interconnected with each other, respectively.

Figure 7:
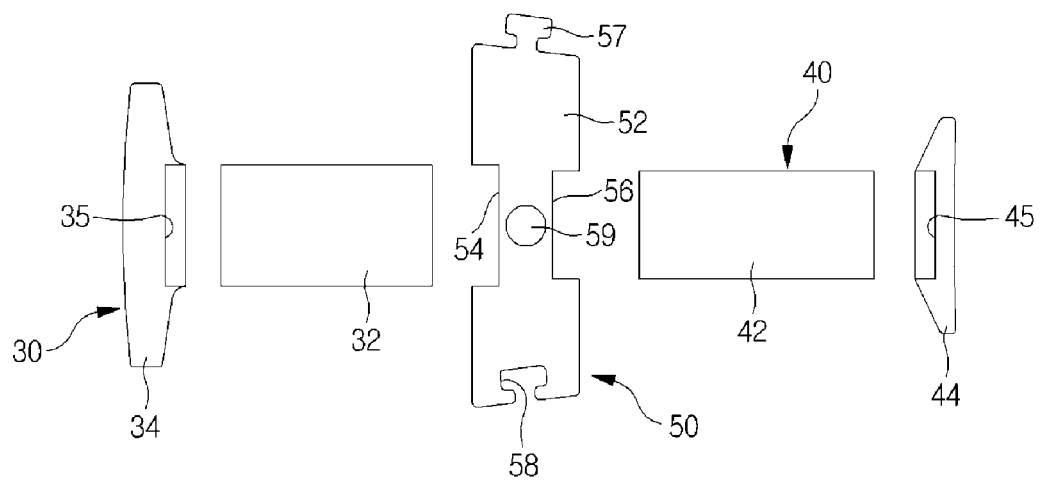
FIG. 7 is an exploded plan view showing a modification of a stator core of a double stator according to the first embodiment of the present invention.

That is, as shown in FIG. 7, press-fit grooves 35 and 45 are formed in the first flange portion 34 and the second flange portion 44, respectively, and one end of the first yoke portion 32 and one end of the second yoke portion 42 are pressed into the press-fit grooves 35 and 45, respectively. Accordingly, the first flange portion 34 and the second flange portion 44 may be mutually assembled with the press-fit grooves 35 and 45, respectively. The first yoke portion 32 is mutually assembled with the first flange portion 34 via a bonding process and the second yoke portion 42 is mutually assembled with the second flange portion 44 via a bonding process.

The first integration type core portion 30 and the second integration type core portion 40 may be also extruded in addition to compression-molding.

The first integration type core portion 30 and the second integration type core portion 40 are respectively formed by mixing amorphous metal powders with a binder at a predetermined ratio and molding the mixture, or by mixing amorphous metal powders and crystalline metal powders having excellent soft magnetic properties with a binder at a predetermined ratio and molding the mixture. In this case, mixing the metal powders at the predetermined ratio may eliminate difficulty of a high-pressure sintering and increase the permeability as compared to using the amorphous metal powders at 100%.

The first integration type core portion 30 and the second integration type core 40 may be also prepared by compression-molding only the soft magnetic powders.

The first coil 16 and the second coil 18 are wound on outer circumferential surfaces of the first yoke portion 32 and the second yoke portion 42, respectively. Here, coil winding grooves 62 and 64 are formed at the upper and lower surfaces of the first yoke portion 32 and the second yoke portion 42, respectively. That is, a height H5 of the first yoke portion 32 and a height H1 of the second yoke portion 42 are made small, and the upper and lower surfaces of the first yoke portion 32 and the second yoke portion 42 are recessed to form a concave shape to have lower heights as compared to the first flange portion 34 and the second flange portion 44, to thus form the coil winding grooves 62 and 64.

The coil winding grooves 62 and 64 include first coil winding grooves 62 that are formed on the upper surfaces of the first yoke portion 32 and the second yoke portion 42, respectively, and that are formed in a concave shape inwardly by a height H8 as compared to the upper surfaces of the first flange portion 34 and the second flange portion 44, respectively, and second coil winding grooves 64 that are formed on the lower surfaces of the first yoke portion 32 and the second yoke portion 42, respectively, and that are formed in a concave shape inwardly by a height H9 as compared to the lower surfaces of the first flange portion 34 and the second flange portion 44, respectively.

In this case, a stack height H2 of the lamination type core portion 50 is set to be the same as heights H5 and H1 of the first and second yoke portions 32 and 42.

In this way, when the height of the lamination type core portion 50 is reduced, the axial height of the stator core 10 is reduced to thus reduce the overall height of the motor, enable slimming of a motor, and reduce the circumferential areas of the first and second yoke portions 32 and 42, to thereby reduce coil winding quantities and reduce a copper loss in the case of exhibiting identical performance.

The lamination type core portion 50 includes: a connecting portion 52 on a surface of which a first press-fit groove 54 is formed in which the first integration type core portion 30 is press-fitted into the first press-fit groove 54, and on the other surface of which a second press-fit groove 56 is formed in which the second integration type core portion 40 is press-fitted into the second press-fit groove 56; a coupling protrusion 57 that is protruded on one side of the connecting portion 52; and a locking groove 58 that is formed in a groove shape on the other side of the connecting portion 52 and into which the coupling protrusion 57 is fitted and coupled.

Figure 3:
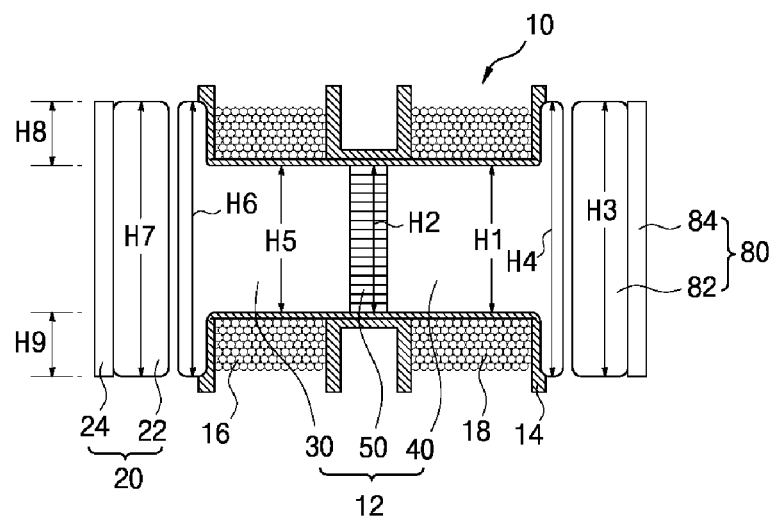
FIG. 3 is a cross-sectional view showing an arrangement of a double stator and a double rotor according to the first embodiment of the present invention.
Figure 4:
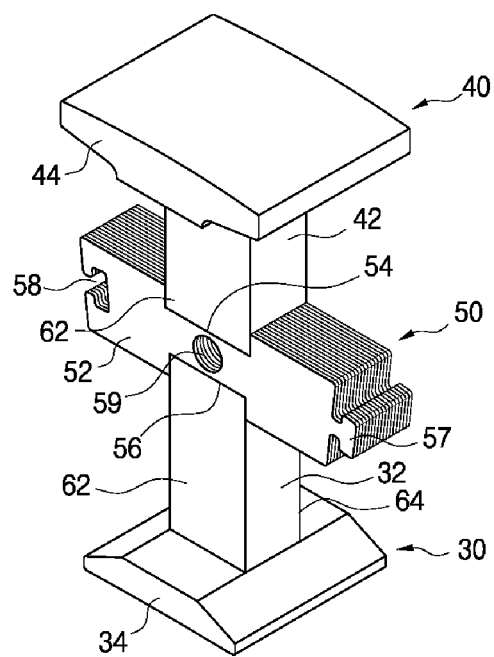
FIG. 4 is a perspective view showing a stator core of a double stator according to the first embodiment of the present invention.
Figure 5:
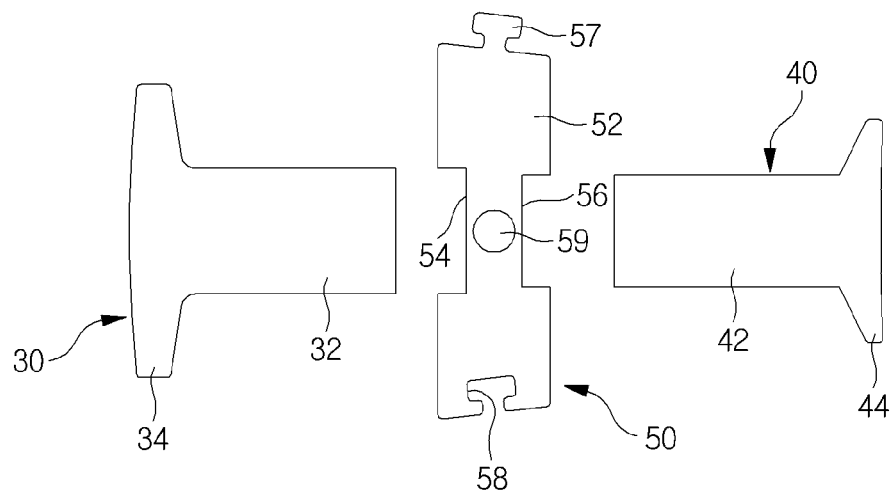
FIG. 5 is an exploded plan view of a stator core of a double stator according to the first embodiment of the present invention.
Figure 6:
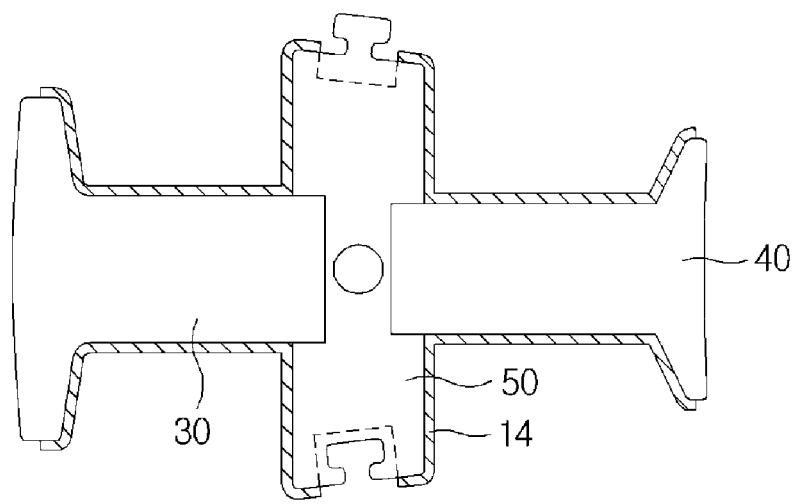
FIG. 6 is a schematic cross-sectional view showing a bobbin is formed in a stator core for a double stator according to the first embodiment of the present invention.

Here, it is possible to apply a structure of mutually connecting between the lamination type core portion 50 and the first integration type core 30 and between the lamination type core portion 50 and the second integration type core 40 by a bonding process to reinforce a coupling strength in addition to a press-fit coupling process. It is also possible to apply an insert molding process between the lamination type core portion 50 and the first integration type core 30 and between the lamination type core portion 50 and the second integration type core 40 by using a resin to reinforce a coupling strength so that the bobbin 14 surrounds spaces between the lamination type core portion 50 and the first integration type core 30 and between the lamination type core portion 50 and the second integration type core 40 with the resin, as shown in FIGS. 3 and 6.

Then, a coupling hole 59 is formed to pass through and at the center of the lamination type core portion 50 and may be used when fixing the stator core 10 to the fixing bracket 11 with a fastening bolt.

In addition, the split type stator core 10 may be formed integrally with the fixing bracket 11 via an insert molding method.

The lamination type core portion 50 may directly connect between the stator cores 12 that are arranged radially to thus be mutually energized between the split type stator cores 12 to thereby form a magnetic circuit.

In addition to this connection structure, although not shown in the drawings, the lamination type core portion 50 may employ a structure of connecting between the stator cores in which pinholes are formed at both end portions of the connecting portion 52 of each of the stator cores, and a pin member is fitted into and coupled with the pinholes of two stator cores at a state where the stator cores contact each other. In addition, although not shown in the drawings, the lamination type core portion 50 may employ a method of caulking the stator cores by using a caulking member in a state where the stator cores contact each other.

Since the lamination type core portion 50 is formed by laminating a plurality of iron pieces, so the strength of the iron pieces is strong, the coupling protrusion 57 is separated from the connecting portion 52.

However, in the case that the lamination type core portion 50 is prepared by compression-molding amorphous metal powders as in the first integration type core portion 30 and the second integration type core portion 40, the structure of a mold is complex and thus it is difficult to manufacture the lamination type core portion 50 via a molding process. In addition, there are concerns that the coupling protrusion 57 may fall off due to the weak strength.

Therefore, in the first embodiment, a portion (of a complex form) of connecting between the plurality of stator cores is prepared by laminating a plurality of iron pieces having a strong strength, and a coil winding portion (of a simple shape) is prepared by compression-molding amorphous metal powders, thereby reducing costs and improving motor performance. The stator cores of a complex multi-slot structure are configured in a split type thereby reducing a core loss and increasing productivity of coil winding to thus have durability of cross-coupling of the split-type cores.

A stack height (H2) of the lamination type core portion 50 is formed identically to the height (H5) of the yoke portion 32 of the first integration type core portion 30 and the height (H1) of the yoke portion 42 of the second integration type core portion 40, respectively, to thus reduce the stack height (H2) of the lamination type core portion 50 to accordingly reduce a manufacturing cost. In addition, when the stack height (H2) of the lamination type core portion 50 is reduced, the axial heights of the stator cores 10 are reduced thereby reducing the overall height of the motor, and enabling slimming of the motor.

Then, the height (H7) of the first magnet 22 and the height (H3) of the second magnet 82 may be designed identically to the height (H6) of the first flange portion 34 and the height (H4) of the second flange portion 44, respectively, to thus reduce the height of the motor and increase the motor efficiency.

Figure 8:
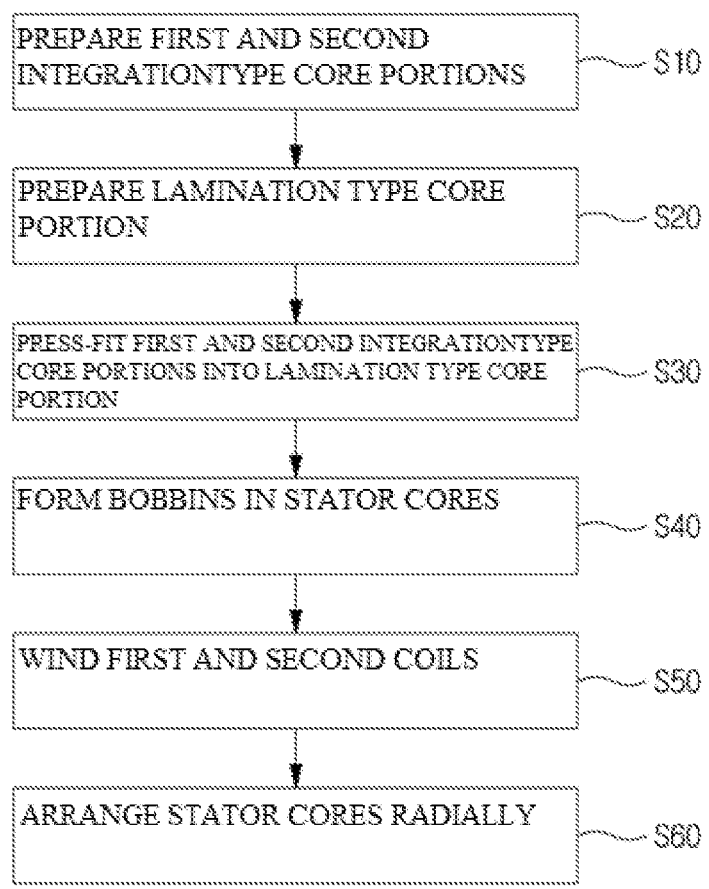
FIG. 8 is a flowchart view illustrating a manufacturing process of a double stator according to the first embodiment of the present invention.

It will be described with respect to a method of manufacturing a stator according to an embodiment of the present invention in the following. FIG. 8 is a flowchart view illustrating a method of manufacturing a stator according to an embodiment of the present invention.

First, a first integration type core portion 30 and a second integration type core 40 are formed by compression-molding amorphous metal powders (S10).

The first integration type core portion 30 and the second integration type core portion 40 are respectively formed by mixing amorphous metal powders with a binder at a predetermined ratio and molding the mixture, or by mixing amorphous metal powders and crystalline metal powders having excellent soft magnetic properties with a binder at a predetermined ratio and molding the mixture. In addition, the first integration type core portion 30 and the second integration type core portion 40 are respectively formed by mixing crystalline metal powders having excellent soft magnetic properties with a binder at a predetermined ratio and molding the mixture.

Then, a lamination type core portion 50 is prepared (S20). That is, a first press-fit groove 54, a second press-fit groove 56, a coupling protrusion 57, a locking groove 58 and a throughhole 59 are integrally formed in one piece by cutting electrical iron steel sheets (hereinafter referred to as "steel plates"). Then, a plurality of steel plates are laminated. Here, the stack height (H2) of the lamination type core portion 50 is formed identically to the height (H5) of the yoke portion 32 of the first integration type core portion 30 and the height (H1) of the yoke portion 42 of the second integration type core portion 40, respectively.

In addition, the first integration type core portion 30 is press-fitted into the first press-fit groove 54 formed on one surface of the lamination type core portion 50, and the second integration type core portion 40 is press-fitted into the second press-fit groove 56 formed on the other surface of the lamination type core portion 50 (S30). That is, the end of the yoke portion 32 of the first integration type core portion 30 is fixed to the first press-fit groove 54 in a forced press-fitting manner, and the end of the yoke portion 42 of the second integration type core portion 40 is fixed to the second press-fit groove 56 in a forced press-fitting manner.

A bobbin 14 is formed by insert molding a resin of an insulating material on the outer surfaces of the first integration type core portion 30, the second integration type core portion 40 and the lamination type core portion 50 (S40). Here, the outer surface of the first flange portion 34, the outer surface of the second flange portion 44, and the coupling protrusion 57 and the locking groove 58 of the lamination type core portion 50 are exposed to the outside without being wrapped by the resin of the insulating material.

The first coil 16 is sequentially wound on the outer surface of the first integration type core portion 30 for each phase of U, V, and W, and the second coil 18 is sequentially wound on the outer surface of the second integration type core portion 40 for each phase of U, V, and W (S50). In this case, when the stator cores are formed of 18 slots, a method of continuously winding a coil on six cores or three cores for each phase and assembling the continuously coil wound cores can be taken.

When the coupling protrusions 57 of the stator cores are respectively fitted into the locking grooves 58 that are disposed adjacent to the coupling protrusions 57 and the plurality of stator cores 12 are radially arranged, an assembly of the stator 10 is completed (S60).

Hereinbelow, a method of manufacturing the first integration type core portion 30 and the second integration type core portion 40 according to an embodiment of the present invention will be described. As an example, a method of manufacturing the first integration type core portion 30 and the second integration type core portion 40 will be described with respect to a case of using amorphous metal powders.

In the case of the first integration type core portion 30 and the second integration type core portion 40 according to the embodiment of the present invention, an amorphous alloy is manufactured into ultra-thin type amorphous alloy ribbons or strips of 30 μm or less by using a rapid solidification processing (RSP) method through a melt spinning process, and then the ultra-thin type amorphous alloy ribbons or strips are pulverized, to thus obtain amorphous metal powders. Here, the obtained amorphous metal powders have a size in the range of 1 to 150 μm.

In this case, the amorphous alloy ribbons or strips may be heat-treated at 400-600° C. under a nitrogen atmosphere, so as to have a nanocrystalline microstructure that can promote high permeability.

In addition, the amorphous alloy ribbons or strips may be heat-treated at 100-400° C. in the air, to improve the pulverization efficiency.

Of course, it is possible to use spherical powders obtained as the amorphous metal powders by an atomization method other than the pulverization method of the amorphous alloy ribbons or strips.

For example, any one of Fe-based, Co-based, and Ni-based amorphous alloys may be used as the amorphous alloy. Preferably, a Fe-based amorphous alloy is advantageous in terms of price. The Fe-based amorphous alloy is preferably any one of Fe—Si—B, Fe—Si—Al, Fe—Hf—C, Fe—Cu—Nb—Si—B, and Fe—Si—N. In addition, the Co-based amorphous alloy is preferably any one of Co—Fe—Si—B and Co—Fe—Ni—Si—B.

Thereafter, the pulverized amorphous metal powder is classified depending on the size of the particle, and then mixed in a powder particle size distribution having optimal composition uniformity. In this case, since the pulverized amorphous metal powder is made up preferably in a plate shape, a packing density is lowered below the optimal condition, when the amorphous metal powder is mixed with a binder to then be molded into a shape of components. Accordingly, the present invention uses a mixture of a predetermined amount of spherical soft magnetic powders with plate-shaped amorphous metal powders, to thus increase the molding density, in which the spherical soft magnetic powders are made of spherical powder particles, to promote improvement of magnetic properties, that is, permeability.

For example, one of MPP powders, HighFlux powders, Sendust powders, and iron powders, or a mixture thereof may be used as the spherical soft magnetic powders that may promote improvement of the permeability and the packing density.

A binder mixed in the mixed amorphous metal powders is, for example, a thermosetting resin such as sodium silicate called water glass, ceramic silicate, an epoxy resin, a phenolic resin, a silicone resin or polyimide. In this case, the maximum mixing ratio of the binder is preferably 20 wt %.

The mixed amorphous metal powders are compression-molded into a desired shape of cores or back yokes by using presses and molds at a state where binders and lubricants have been added in the amorphous metal powders. When a compression-molding process is achieved by presses, a molding pressure is preferably set to 15-20 ton/cm$^2$.

After that, the molded cores or back yokes are sintered in the range of 300-600° C. for 10-600 min to implement magnetic properties.

In the case that the heat-treatment temperature is less than 300° C., heat treatment time increases to thus cause a reduction in productivity, and in the case that heat-treatment temperature exceeds 600° C., deterioration of the magnetic properties of the amorphous alloys occurs.

In addition, in some embodiments of the present invention, only soft magnetic powders can be compression-molded other than the amorphous metal powders.

As described above, since amorphous metal powders or soft magnetic powders are compression-molded, in some embodiments of the present invention, the integration type core portions of complex shapes are easily molded, and the crystalline metal powders having excellent soft magnetic properties is also added in the amorphous metal powders, to thereby promote improvement of the magnetic permeability and improvement of the molding density at the time of compression-molding.

Furthermore, when the first integration type core portion and the second integration type core portion are manufactured, in some embodiments of the present invention, the first integration type core portion and the second integration type core portion are molded by using amorphous metal powders or soft magnetic powders, or by using a mixture of crystalline metal powders with amorphous metal powders, to thereby minimize an eddy current loss (or a core loss), and to thus be appropriate to be used as a high speed motor of over 50,000 rpm.

Figure 11:
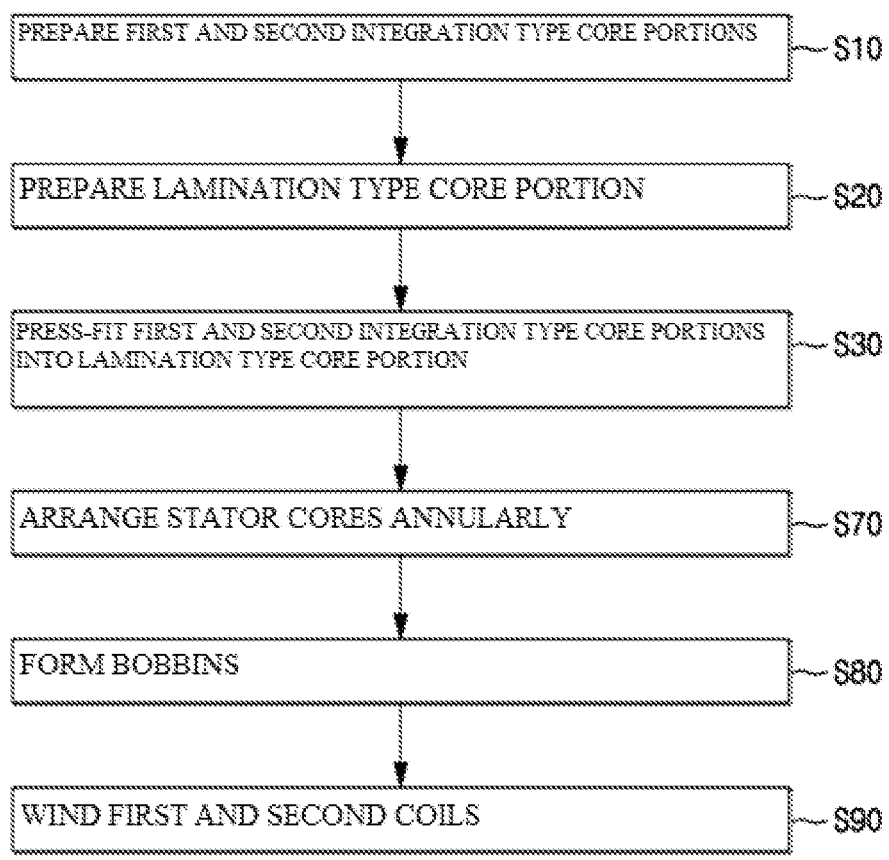
FIG. 11 is a flowchart view illustrating another manufacturing process of a double stator according to the first embodiment of the present invention.

Meanwhile, a double stator according to the first embodiment may be manufactured in a different assembly method shown in FIG. 11.

Figure 9:
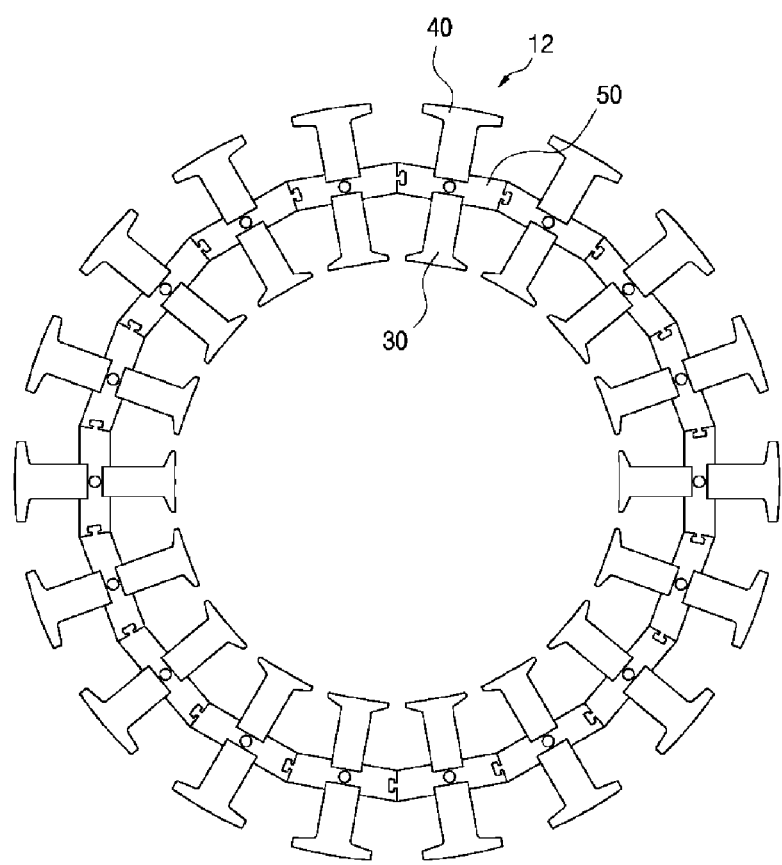
FIG. 9 is a plan view of stator cores for a double stator according to the first embodiment of the present invention.
Figure 10:
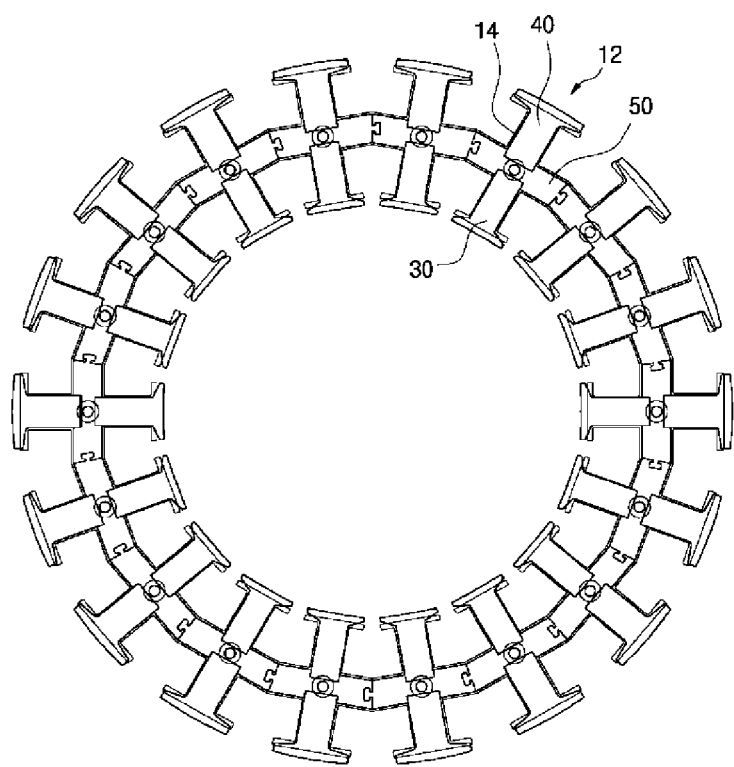
FIG. 10 is a schematic plan view showing bobbins are formed in stator cores for a double stator according to the first embodiment of the present invention.

FIG. 9 is a plan view of stator cores for a double stator according to the first embodiment of the present invention, in which the stator cores are arranged in an annular form. FIG. 10 is a schematic plan view showing bobbins are wrapped by stator cores for a double stator according to the first embodiment of the present invention. FIG. 11 is a flowchart view illustrating another manufacturing process of a double stator according to the first embodiment of the present invention.

First, a first integration type core portion 30 and a second integration type core 40 are formed by compression-molding amorphous metal powders (S10).

The first integration type core portion 30 and the second integration type core portion 40 are respectively formed by mixing amorphous metal powders with a binder at a predetermined ratio and molding the mixture, or by mixing amorphous metal powders and crystalline metal powders having excellent soft magnetic properties with a binder at a predetermined ratio and molding the mixture. In addition, the first integration type core portion 30 and the second integration type core portion 40 are respectively formed by mixing crystalline metal powders having excellent soft magnetic properties with a binder at a predetermined ratio and molding the mixture.

Then, a lamination type core portion 50 is prepared (S20). That is, a first press-fit groove 54, a second press-fit groove 56, a coupling protrusion 57, a locking groove 58 and a throughhole 59 are integrally formed in one piece by cutting electrical iron steel sheets. Then, a plurality of steel plates are laminated.

In addition, the first integration type core portion 30 is press-fitted into the first press-fit groove 54 formed on one surface of the lamination type core portion 50, and the second integration type core portion 40 is press-fitted into the second press-fit groove 56 formed on the other surface of the lamination type core portion 50 (S30). That is, the end of the yoke portion 32 of the first integration type core portion 30 is fixed to the first press-fit groove 54 in a forced press-fitting manner, and the end of the yoke portion 42 of the second integration type core portion 40 is fixed to the second press-fit groove 56 in a forced press-fitting manner.

In this way, as the assembly of the plurality of the stator cores is finished, the plurality of the stator cores 12 are combined and arranged in an annular shape, as shown in FIG. 9. That is, the coupling protrusion 57 formed on one side of the lamination type core portion 50 of one stator core 12 is fitted into and coupled with the locking groove 58 formed on the other side of the lamination type core portion 50 of the other stator core 12 adjacent to the one stator core 12, to thereby arrange the stator cores in an annular form (S70).

Then, as shown in FIG. 10, a bobbin 14 is formed by insert molding a resin of an insulating material on the outer surfaces of the annularly arrange stator cores 12 (S80). Here, the outer surface of the first flange portion 34, the outer surface of the second flange portion 44, and the coupling protrusion 57 and the locking groove 58 of the lamination type core portion 50 are exposed to the outside without being wrapped by the resin of the insulating material.

With respect to each of the bobbins 14 of the annularly arrange stator cores 12, the first coil 16 is sequentially wound on the outer surface of the first integration type core portion 30 for each phase of U, V, and W, and the second coil 18 is sequentially wound on the outer surface of the second integration type core portion 40 for each phase of U, V, and W (S90).

Figure 12:
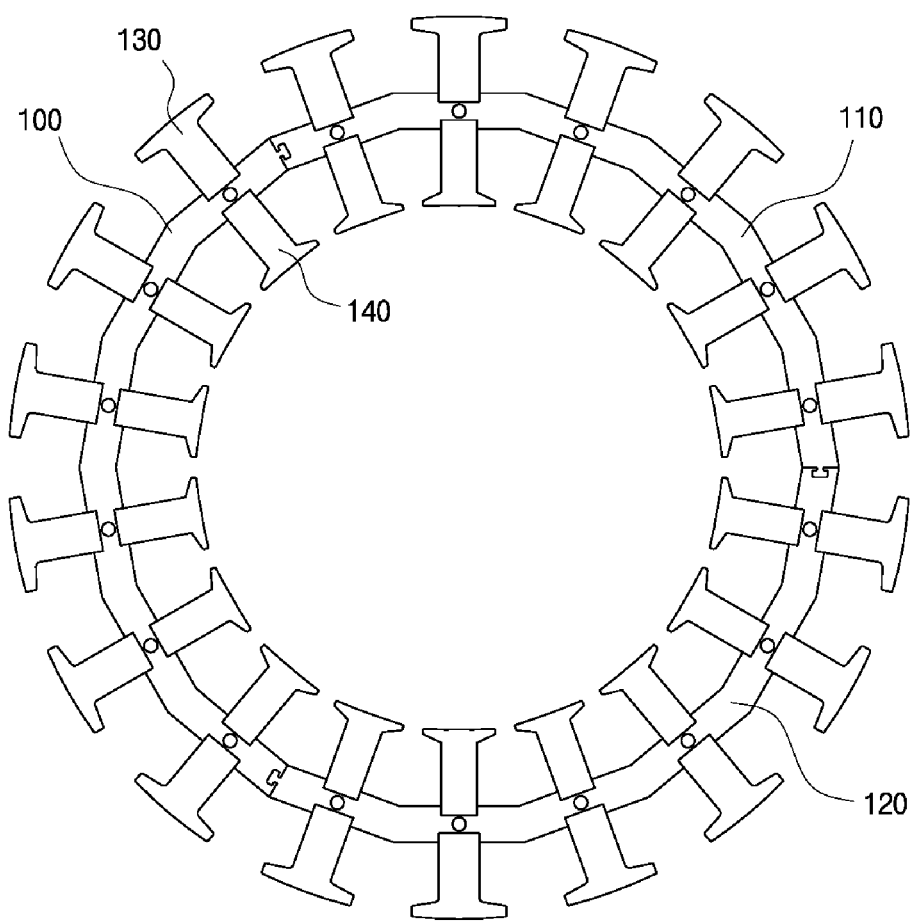
FIG. 12 is a plan view of stator cores for a double stator according to a second embodiment of the present invention.
Figure 13:
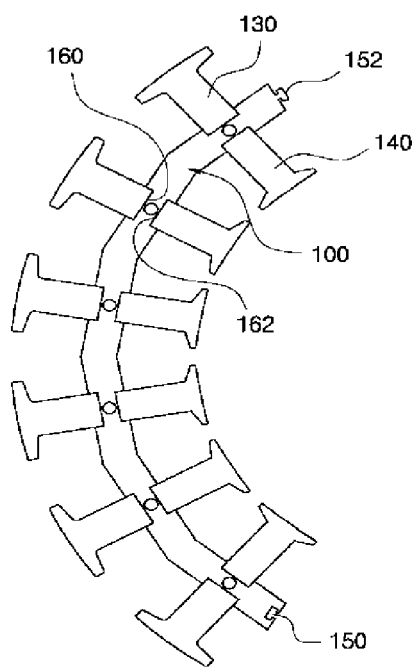
FIG. 13 is a plan view of first lamination type core portions according to the second embodiment of the present invention.

FIG. 12 is a plan view of stator cores for a double stator according to a second embodiment of the present invention. FIG. 13 is a plan view of first lamination type core portions according to the second embodiment of the present invention.

The stator core according to the second embodiment of the present invention includes: a lamination type core portion 100, 110, or 120 that is mutually assembled with the adjacent lamination type core portion 100, 110, or 120 to form an annular shape and that is formed by laminating a plurality of iron pieces; a first integration type core portion 130 that is integrally formed by compression-molding amorphous metal powders in a mold, and that is fixed in a radial form on the outer surface of the lamination type core portion 100, 110, or 120; and a second integration type core portion 140 that is integrally formed by compression-molding amorphous metal powders in a mold, and that is fixed in a radial form on the inner surface of the lamination type core portion 100, 110, or 120.

Here, the first integration type core portion 130 and the second integration type core portion 140 according to the second embodiment of the present invention are equal to the first integration type core portion 30 and the second integration type core portion 40 according to the first embodiment of the present invention.

The lamination type core portions 100, 110, and 120 include: a first lamination type core portion 100 that is formed of a circular arc of a predetermined angle; a second lamination type core portion 110 that is subsequently assembled to the first lamination type core portion 100, and that is formed in the same fashion as that of the first lamination type core portion 100; and a third lamination type core portion 120 that is assembled between the first lamination type core portion 100 and the second lamination type core portion 110, and that is formed in the same fashion as those of the first lamination type core portion 100 and the second lamination type core portion 110.

The first lamination type core portion 100, the second lamination type core portion 110 and the third lamination type core portion 120 are formed, for example, in a circular arc shape of 120° in which a locking groove 150 is formed on one end of each of the first lamination type core portion 100, the second lamination type core portion 110 and the third lamination type core portion 120, and a coupling protrusion 152 is formed on the other end of each of the first lamination type core portion 100, the second lamination type core portion 110 and the third lamination type core portion 120, in which the coupling protrusion 152 is fitted into the locking groove 150.

A plurality of first press-fit grooves 160 are formed at a predetermined interval on outer surfaces of the first lamination type core portion 100, the second lamination type core portion 110 and the third lamination type core portion 120, in which a plurality of the first integration type core portions 130 are press-fitted into and fixed to the plurality of first press-fit grooves 160, respectively, and a plurality of second press-fit grooves 162 are formed at a predetermined interval on inner surfaces of the first lamination type core portion 110, the second lamination type core portion 110 and the third lamination type core portion 120, in which a plurality of the second integration type core portions 140 are press-fitted into and fixed to the plurality of second press-fit grooves 162, respectively.

The three lamination type core portions are illustrated in the second embodiment on the drawing, but two lamination type core portions that are formed at an interval of 180° may be available, and four lamination type core portions that are formed at an interval of 90° may be available. In addition, lamination type core portions over four may be available.

As described above, since the stator cores according to the second embodiment are formed in arc shape having a predetermined angle, an assembly process of mutually assembling the lamination type core portions can be reduced to thus simplify a manufacturing process.

Figure 14:
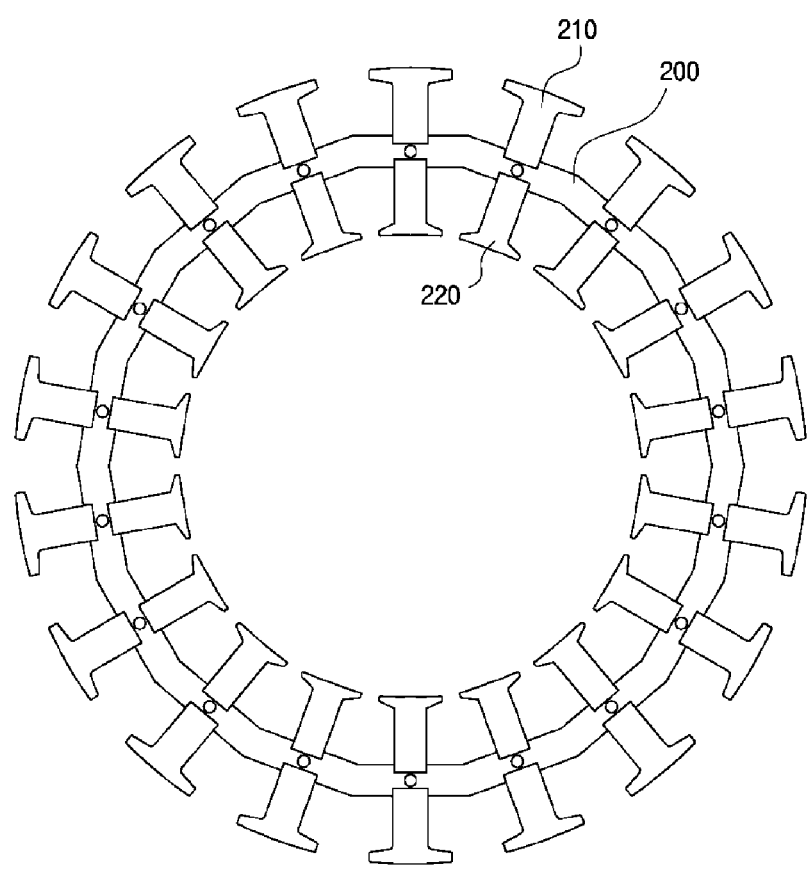
FIG. 14 is a plan view of stator cores for a double stator according to a third embodiment of the present invention.
Figure 15:
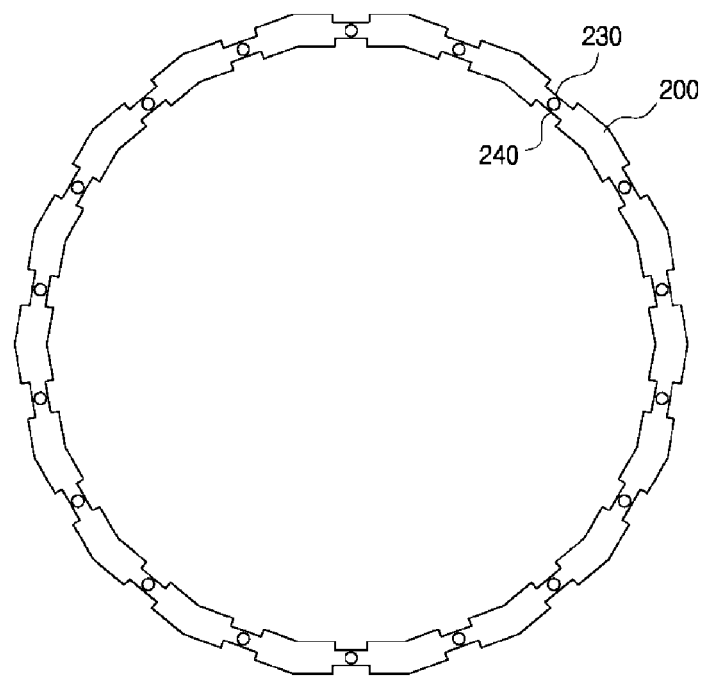
FIG. 15 is a plan view of a lamination type core portion according to the third embodiment of the present invention.

FIG. 14 is a plan view of stator cores for a double stator according to a third embodiment of the present invention. FIG. 15 is a plan view of a lamination type core portion according to the third embodiment of the present invention.

The stator core according to the third embodiment of the present invention includes: a lamination type core portion 200 that is formed in an annular shape; a first integration type core portion 210 that is integrally formed by compression-molding amorphous metal powders in a mold, and that is fixed in a radial form on the outer surface of the lamination type core portion 200; and a second integration type core portion 22 that is integrally formed by compression-molding amorphous metal powders in a mold, and that is fixed in a radial form on the inner surface of the lamination type core portion 200.

Here, the first integration type core portion 210 and the second integration type core portion 220 according to the third embodiment of the present invention are equal to the first integration type core portion 30 and the second integration type core portion 40 according to the first embodiment of the present invention.

The lamination type core portion 200 is formed into a circular ring shape, and is formed by laminating a plurality of iron pieces, in which a plurality of first press-fit grooves 230 are formed at a predetermined interval on an outer surface of the lamination type core portion 200 in which a plurality of first integration type core portions 210 are press-fitted into the plurality of the first press-fit grooves 230, respectively, and a plurality of second press-fit grooves 240 are formed at a predetermined interval on an inner surface of the lamination type core portion 200 in which a plurality of second integration type core portions 220 are press-fitted into the plurality of the second press-fit grooves 240, respectively.

Thus, since the stator core according to the third embodiment is configured to include the lamination type core portion that is formed in an integral ring-shaped core shape, the stator cores do not have to be assembled to each other, to improve productivity.

Figure 16:
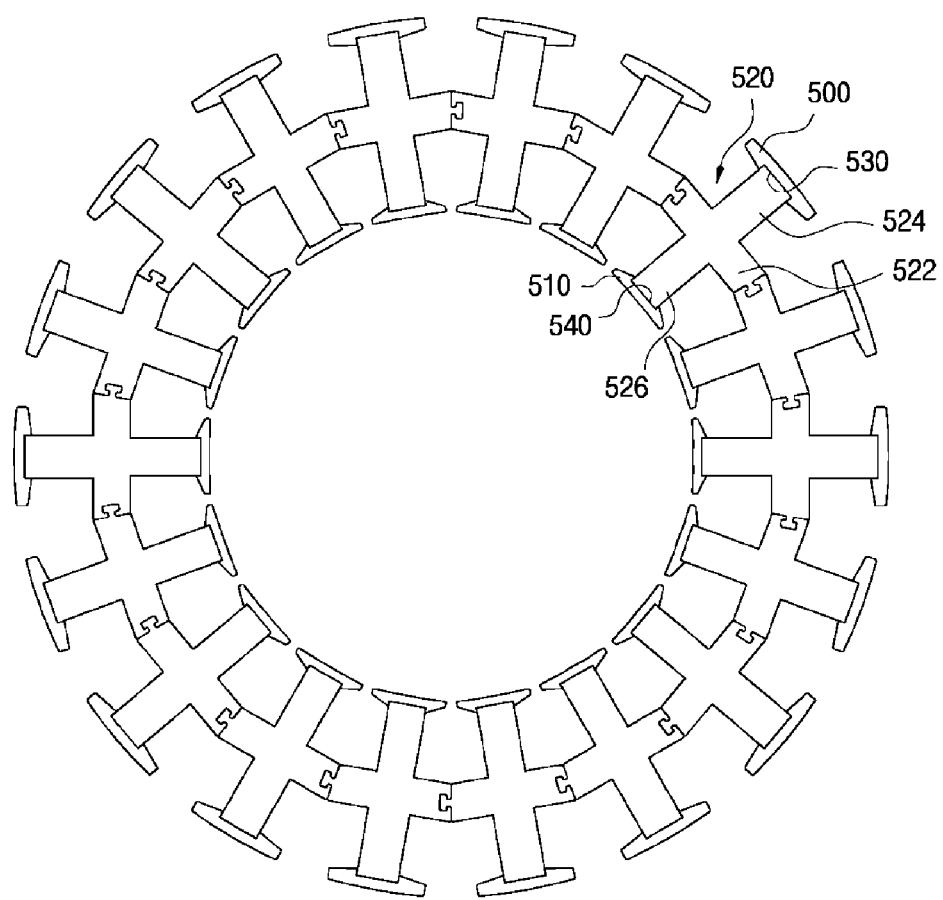
FIG. 16 is a plan view of stator cores for a double stator according to a fourth embodiment of the present invention.

FIG. 16 is a plan view of stator cores for a double stator according to a fourth embodiment of the present invention.

The stator core according to the fourth embodiment of the present invention includes: a first integration type core portion 500 and a second integration type core portion 510 that are respectively integrally formed by compression-molding amorphous metal powders in a mold; and a lamination type core portion 520 that is formed by laminating a plurality of iron pieces in which the first integration type core portion 500 and the second integration type core portion 510 are press-fitted and fixed to the lamination type core portion 520.

The first integration type core portion 500 and the second integration type core portion 510 are formed in a flange shape so that the first integration type core portion 500 and the second integration type core portion 510 are press-fitted with and fixed to both sides of the lamination type core portion 520, and are prepared in the same way as those of the first integration type core portion 30 and the second integration type core portion 40 according to the first embodiment of the present invention.

Then, the lamination type core portion 520 includes: a ring portion 522 formed in an annular shape when assembled with the neighboring ring portions 522; a first yoke portion 524 that extends from one side of the ring portion 522 and on which a first coil 16 is wound; and a second yoke portion 526 that extends from the other side of the ring portion 522 and on which a second coil 18 is wound.

The lamination type core portion 520 is prepared in the same manner as the lamination type core portion 50 described in the first embodiment above.

Press-fit grooves 530 and 540 are formed on the first integration type core portion 500 and the second integration type core 510, respectively, in which the first yoke portion 524 and the second yoke portion 526 are press-fitted into and fixed to the press-fit grooves 530 and 540, respectively.

The ring portion 522 is formed in any one type of a type forming an annular shape in the case of being split and mutually assembled, as in the first embodiment, a type forming an arc shape in the case of being mutually assembled, as in the second embodiment, and a type forming a ring shape as in the third embodiment.

As described above, the stator core according to the fourth embodiment of the present invention is configured to include: the first yoke portion 524 and the second yoke portion 526 around which the first coil 16 and the second coil 18 are respectively wound and the ring portion 522 that are formed by laminating the plurality of iron pieces; and the first integration type core portion 500 and the second integration type core 510 that are press-fitted with and fixed to the end portions of the first yoke portion 524 and the second yoke portion 526, respectively, that are respectively integrally formed by compression-molding amorphous metal powders in a mold.

Thereafter, the first yoke portion 524 and the second yoke portion 526 of the lamination type core portion 520 are press-fitted with and fixed to the press-fit grooves 530 and 540 of the first integration type core portion 500 and the second integration type core portion 510 and then a resin of an insulating material is insert molded on the outer surfaces of the first integration type core portion 500 and the second integration type core 510, to thereby form a bobbin 14.

In this case, the bobbin 14 is formed for each one of the teeth to then be assembled with the other neighboring bobbins, or the bobbins 14 may be made with respect to the entire assembled stator cores.

The bobbin 14 plays a role of defining a region on which the coil 16 is wound while surrounding part of the lamination type core portion 520, the first integration type core portion 500 and the second integration type core portion 510, and strengthening a coupling strength between each of the first integration type core portion 500 and the second integration type core 510 and the lamination type core portion 520.

The bobbin may have a top cover and a bottom cover which can be assembled with and formed in the bobbin, as necessary.

Then, the coil 16 is wound on each of the bobbins 14, and a number of stator coils around which the coils are wound are assembled in an annular form, to thus form a stator.

According to the stator core according to the fourth embodiment, when the first yoke portion 524 and the second yoke portion 526 around which the coils 16 are wound are formed of the lamination type core portions, a magnetization strength becomes high to thereby increase efficiency as compared with a case that the yoke portion is formed of amorphous metal powders.

In addition, the stator core according to the fourth embodiment is also configured so that the stack height of the lamination type core portion 520 is formed identically to the heights of the yoke portions 524 and 526, in the same manner as that of the first embodiment, to thereby reduce the stack height of the lamination type core portion 520.

Accordingly, it is possible to achieve axial slimming of the entire motor by reducing the height of the yoke portion around which the coil is wound, and the circumferential length of a core is reduced by making an area of the yoke portion equal and reducing the height thereof, to thereby reduce a copper loss and a weight of the coil.

Figure 17:
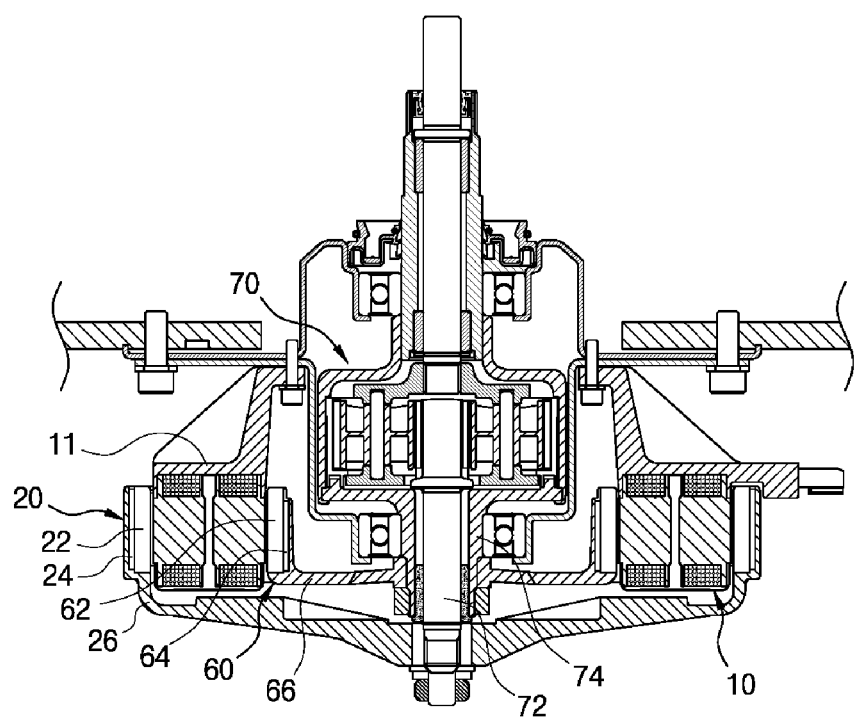
FIG. 17 is a cross-sectional view showing a structure that a double stator according to the present invention is applied to a full-automatic washing machine drive motor of a two-axis structure.

FIG. 17 is a cross-sectional view showing a structure that a double stator according to the present invention is applied to a full-automatic washing machine drive motor of a two-axis structure.

A drive motor for a full-automatic washing machine shown in FIG. 17 includes: a double stator 10, an outer rotor 20 that is disposed with a gap on an outer surface of the double stator 10; an inner rotor 60 that is disposed with a gap on an inner surface of the double stator 10; and a planetary gear set 70 that is connected to any one of the inner rotor 60 and the outer rotor 20 to decelerate a rotational speed.

The double stator 10 may employ one of the double stators as described in the first to fourth embodiments.

The outer rotor 20 includes: a first magnet 22 that is disposed on the outer surface of the double stator 10 with a certain gap; a first back yoke 24 disposed on the rear surface of the first magnet 22; and an outer rotor support 26 that is integrally formed with the first magnet 22 and the first back yoke 24 by an insert molding method.

Here, the outer rotor support 56 is integrally formed with the first magnet 22 and the first back yoke 24 by molding a thermosetting resin, for example, a BMC (Bulk Molding Compound) molding material such as polyester.

The inner rotor 60 includes: a second magnet 62 that are disposed on the inner surface of the double stator 10 with a certain gap; a second back yoke 64 disposed on the rear surface of the second magnet 62; and an inner rotor support 66 that is integrally formed with the second magnet 62 and the second back yoke 64 by an insert molding method.

The outer rotor support 26 is connected to an inner shaft 72, and the inner rotor support 66 is connected to an outer shaft 74. The inner shaft 72 and the outer shaft 74 are formed of a coaxial structure, are rotatably supported by a pair of sleeve bearings, and are respectively divided into an upper side and a lower side to be connected to an input and an output of a planetary gear set 70 at the upper side and the lower side.

The planetary gear set 70 includes: a ring gear coupling the lower-side outer shaft 74; a sun gear coupled to the lower-side inner shaft 72; a plurality of planetary gears engaged with an outer surface of the sun gear and an inner surface of the ring gear; and a carrier to which the plurality of planetary gears are supported and that is connected to the upper-side inner shaft with which a pulsator is combined.

The leading end of the upper-side outer shaft 74 is connected to a washing tub, and the leading end of the upper-side inner shaft 72 is connected with the pulsator.

The planetary gear set 70 decelerates the rotational speed of the outer rotor 20 that is transmitted to the inner shaft 72 to thus increase a torque and transmit the increased torque to the pulsator.

In the illustrated embodiment, the outer rotor support 26 is connected to the inner shaft 72 and the inner rotor support 66 is connected to the outer shaft 74, but the outer rotor support 26 may be connected to the outer shaft 74 and the inner rotor support 66 may be connected to the inner shaft 72. Therefore, the planetary gear 70 may be coupled to any one of the outer rotor 20 and the inner rotor 60 to thus decelerate the rotational speed.

When the motor according to the embodiment of the present invention is applied to a full-automatic washing machine, the inner shaft 72 and the outer shaft 74 can be driven independently by applying a drive signal selectively to the first and second coils 10 of the double stator.

As a result, the motor in accordance with the embodiment of the present invention may be configured so that only the pulsator rotates when only the outer rotor 20 is driven, only the washing tub rotates when only the inner rotor 60 is driven, and both the pulsator and the washing tub rotate when both the outer rotor 20 and the inner rotor 60 are driven. Thus, according to the embodiment of the present invention, the pulsator and the washing tub can be driven independently, to thereby implement various types of washing modes by using the independent driving of the pulsator and the washing tub.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention can be applied to a double stator having a configuration of a hybrid type stator core that is formed by combining a lamination type core and a compressed powder magnetic core in a manner to supplement disadvantages of and take advantages of a one-piece integration type core of the lamination type core and the compressed powder magnetic core, to thus achieve a high-power, high-speed, high-efficiency, and thin structured stator, and a motor having the same, in particular, a drive motor for a drum washing machine.

The invention claimed is:
1. A double stator comprising:
a stator core;
a bobbin wrapped on an outer circumferential surface of the stator core; and
a first coil wound on one side of the stator core and a second coil wound on the other side of the stator core,
wherein the stator core comprises:
a lamination type core portion that is formed by laminating a plurality of iron pieces, on an outer surface of which a first press-fit groove is formed, and on an inner surface of which a second press-fit groove is formed;

a first integration type core portion that is fixed to the first press-fit groove of the lamination type core portion, integrally formed by metal powders, and on which the first coil is wound; and a second integration type core portion that is fixed to the second press-fit groove of the lamination type core portion, integrally formed by metal powders, and on which the second coil is wound.

2. The double stator of claim 1, wherein the first integration type core portion comprises: a first yoke portion on which the first coil is wound; and a first flange portion that is integrally formed at one end of the first yoke portion and that is disposed to face to an outer rotor, and wherein the second integration type core portion comprises: a second yoke portion on which the second coil is wound; and a second flange portion that is integrally formed at one end of the second yoke portion and that is disposed to face to an inner rotor.

3. The double stator of claim 2, wherein a stack height of the plurality of iron pieces is set to be same as heights of the first and second yoke portions.

4. The double stator of claim 2, wherein coil winding grooves whose heights are formed lower than those of top and bottom surfaces of the first and second flange portions are formed on top and bottom surfaces of the first and second yoke portions, respectively.

5. The double stator of claim 1, wherein the bobbin surrounds a portion of outer circumferential surfaces of the first and second integration type core portions and the lamination type core portion, so as to integrate the first and second integration type core portions with the lamination type core portion.

6. The double stator of claim 1, wherein the lamination type core portion comprises:

a connecting portion on an outer surface of which the first press-fit groove is formed, and on an inner surface of which the second press-fit groove is formed;

a coupling protrusion that is formed on one side of the connecting portion; and a locking groove that is formed on the other side of the connecting portion and into which the coupling protrusion is fitted and coupled, wherein the lamination type core portion includes a plurality of lamination type core portions cross-coupled in an annular form.

7. The double stator of claim 1, wherein the lamination type core portion comprises:

a first lamination type core portion formed in an arc form of a predetermined angle;

a second lamination type core portion that is assembled with the first lamination type core portion; and a third lamination type core portion that is assembled between the second lamination type core portion and the first lamination type core portion, wherein the first, second and third lamination type core portions are cross-coupled in an annular form.

8. The double stator of claim 7, wherein a locking groove is formed at one end of each of the first, second and third lamination type core portions and a coupling protrusion is formed at the other end of each of the first, second and third lamination type core portions, and wherein the first press-fit groove is formed at a predetermined interval on respective outer surfaces of the first, second and third lamination type core portions in which the first integration type core portion is press-fitted into each of the first press-fit grooves, and the second press-fit groove is formed at a predetermined interval on respective inner surfaces of the first, second and third lamination type core portions in which the second integration type core portion is press-fitted into each of the second press-fit grooves.

9. The double stator of claim 1, wherein the lamination type core portion is formed into a circular ring shape, in which the first press-fit groove is formed at a predetermined interval on an outer surface of the circular ring shape in which the first integration type core portion is press-fitted into each of the first press-fit grooves, and the second press-fit groove is formed at a predetermined interval on an inner surface of the circular ring shape in which the second integration type core portion is press-fitted into each of the second press-fit grooves.

10. The double stator of claim 1, wherein the first and second integration type core portions are formed of amorphous metal powders, soft magnetic powders, or alloy powders that are formed by mixing amorphous metal powders and spherical type soft magnetic powders.

11. The double stator of claim 1, wherein the lamination type core portion is bolted to a fixing bracket.

12. A motor comprising:

a double stator according to claim 1;

an outer rotor that is disposed at a predetermined gap on an outer circumferential surface of the double stator; and an inner rotor that is disposed at a predetermined gap on an inner circumferential surface of the double stator.

13. The motor of claim 12, further comprising a planetary gear set for decelerating the rotational speed of any one of the outer rotor and the inner rotor.

14. The motor of claim 12, wherein the outputs of the outer rotor and the inner rotor are output via a single axis of rotation.

15. The method of claim 12, wherein the outer rotor is connected to an inner shaft connected to a pulsator of a washing machine, and the inner rotor is connected to an outer shaft connected to a washing tub of the washing machine.

16. A double stator comprising:

a plurality of split type stator cores that are mutually connected in an annular form;

a plurality of bobbins wrapped on respective outer circumferential surfaces of the plurality of split type stator cores; and a first coil wound on one side of each of the plurality of bobbins, and a second coil wound on the other side of each of the plurality of bobbins, wherein each of the plurality of split type stator cores comprises:

a lamination type core portion that is formed by laminating a plurality of iron pieces, on an outer surface of which a first press-fit groove is formed, and on an inner surface of which a second press-fit groove is formed, in which one lamination type core portion is cross-coupled with another;

a first integration type core portion that is fixed to the first press-fit groove of the lamination type core portion, integrally formed by metal powders, and on which the first coil is wound; and a second integration type core portion that is fixed to the second press-fit groove of the lamination type core portion, integrally formed by metal powders, and on which the second coil is wound.

17. A double stator comprising:

a plurality of split type stator cores that are mutually connected in an annular form;

a plurality of bobbins wrapped on the respective outer circumferential surfaces of the plurality of split type stator cores; and a first coil wound on one side of each of the plurality of bobbins, and a second coil wound on the other side of each of the plurality of bobbins, wherein each of the plurality of split type stator cores comprises:

a lamination type core portion that is formed by laminating a plurality of iron pieces, and that comprises: a ring portion that is formed in an annular shape; a first yoke portion that is extended from one side of the ring portion and on which the first coil is wound; and a second yoke portion that is extended from the other side of the ring portion and on which the second coil is wound;

a first integration type core portion into which the first yoke portion is press-fitted and that is integrally formed by compression-molding amorphous metal powders; and a second integration type core portion into which the second yoke portion is press-fitted and that is integrally formed by compression-molding amorphous metal powders.

18. The double stator of claim 17, wherein the ring portion is formed in any one type of a first type forming an annular shape in case of being split and mutually assembled, a second type forming an arc shape in case of being mutually assembled, and a third type forming a ring shape.

* * * * *